Feb. 25, 1958 R. L. MILLER 2,824,906

TRANSMISSION AND RECONSTRUCTION OF ARTIFICIAL SPEECH

Filed April 3, 1952 5 Sheets-Sheet 1

INVENTOR
R. L. MILLER

BY Harry C. Hart

ATTORNEY

INVENTOR
R. L. MILLER
BY Harry C. Hart
ATTORNEY

Feb. 25, 1958 R. L. MILLER 2,824,906

TRANSMISSION AND RECONSTRUCTION OF ARTIFICIAL SPEECH

Filed April 3, 1952 5 Sheets-Sheet 3

INVENTOR
R. L. MILLER
BY Harry C. Hart
ATTORNEY

INVENTOR
R. L. MILLER
BY Harry C. Hart
ATTORNEY

TRANSMISSION AND RECONSTRUCTION OF ARTIFICIAL SPEECH

Filed April 3, 1952 5 Sheets-Sheet 5

INVENTOR
R. L. MILLER
BY Harry C. Hart
ATTORNEY

United States Patent Office 2,824,906

Patented Feb. 25, 1958

2,824,906

TRANSMISSION AND RECONSTRUCTION OF ARTIFICIAL SPEECH

Ralph L. Miller, Chatham, N. J., assignor to Bell Telephone Laboratories, Incorporated, New York, N. Y., a corporation of New York Application April 3, 1952, Serial No. 280,337

12 Claims. (Cl. 179—1)

The invention relates to the artificial production of speech or similar complex waves from control signals and to the derivation of suitable control signals from original speech waves with a view to the transmission thereof from point to point over a narrow-band transmission medium.

The principal object of the invention is to reduce, as far as possible, the frequency band width required for the transmission of speech reconstruction control signals, without sacrifice of intelligibility or introduction of an objectionable amount of unnatural quality into the reconstructed speech.

In the vocoder transmission system of Dudley Patent 2,151,091, an input speech wave is analyzed to determine its fundamental frequency or pitch and the distribution of amplitudes among a number of frequency sub-bands into which the speech frequency range is divided. The result of this analysis is translated into a number of control currents, each representative of the energy in one sub-band. The control currents are transmitted to a synthesizer and there utilized to build up, from sources of energy in the synthesizer, an artificial speech wave having the characteristic pitch and amplitude-frequency distribution of the original impressed speech.

Apparatus of this character is capable of reconstructing sounds of all kinds, whether they be the sounds of human speech or not, provided their frequency ranges, rates of variation and other such characteristics, lie within the same ranges as those of human speech. This great amount of flexibility or adaptability is secured by virtue of the general character of the synthesizing apparatus and at the price of a large number of control currents. For purposes of transmission of the sounds of human speech exclusively, however, the flexibility is useless, and the frequency band required to operate the synthesizer is uneconomical.

A different approach to the problem of artificial speech transmission is suggested in Dudley Patent 2,243,527, which teaches that the electrical network which acts to synthesize the artificial speech may profitably be an electrical analog counterpart of the human vocal tract with its back cavity adjacent to the vocal chords, its front cavity adjacent to the lips, and the constriction which joins them, defined by the tongue hump and the roof of the mouth.

This electrical analog counterpart consists of two tandem resonant circuits which are shunted across the "buzz" source of voiced-frequency energy or the "hiss" source of unvoiced energy, as the case may be. The resonant frequency of each circuit is varied by means of a controlled variable inductance. The control signals are obtained by analyzing the original speech spectrum for that part which is instantaneously predominant.

The present invention approaches the problem by the same avenue as does the Dudley Patent 2,243,527 but provides improved means by which its objectives are actualized. The controlled variation of only a single inductance element in each of the two tuned circuits of Dudley's resonance synthesizer is far from sufficient to imitate the complex changes of the configuration of the cavities of the vocal tract. The magnitude of the coupling condenser in the Dudley patent is critical. If it is large, as implied, then only a single resonance occurs; while if it is small, then improper amplitude relations between the two resonances obtain.

In the present invention, all the significant element values of the electrical circuit analog follow independent and specified laws under control of a single control signal derived by the analyzer. This is accomplished by a flexible arrangement which allows the control of any circuit elements in accordance with any law which is consistent with the nature of speech. Furthermore, the "hiss" source output is applied to a different point of the equivalent network, as compared to the "buzz" source, which is in close accord with the manner in which unvoiced sounds are generated in actual speech.

The analysis of the original speech wave for deriving the spectrum control signal is accomplished in a novel manner which depends on the comparison between the locations on the frequency scale of the first and second formants regardless of their relative amplitudes. This avoids the possibility of an ambiguous control signal which might result if the predominant point of the spectrum were utilized alone. This possible ambiguity is due to the fact that the frequency of the second formant or resonance is a two-valued function in its relation to the frequency of the first formant which is nearly always the larger of the two in amplitude. These and various other features will appear from the detailed description which follows.

The invention will be fully apprehended from the following detailed description of an illustrative embodiment thereof taken in connection with the appended drawings in which.

Before discussing the construction of the apparatus itself, it is advisable first to discuss certain relations which hold among the component frequencies of spoken sounds and which are turned to account it the construction of the apparatus.

Experimentally determined data which have been taken on the speech sounds of large numbers of talkers reveal that the quality of human speech is to a large extent determined by the frequencies of the first and second formants and that for any particular speaker, as the vowel sound changes progressively from the deepest oo (moon) to the sharpest ee (seen), the second formant changes in frequency progressively through the range extending from approximately 700 cycles per second to approximately 2400 cycles per second, while the first formant increases from approximately 200 cycles per second to approximately 800 cycles per second for the intermediate vowel a (sat) and then falls again in the second half of the vowel range to a frequency of about 300 cycles per second.

Figure 1:
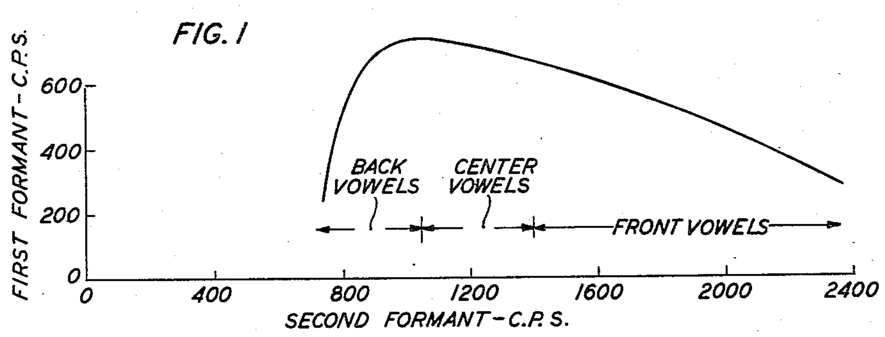
Figs. 1 and 2 are graphs of assistance in the explanation of certain features of the invention.
Figure 2:
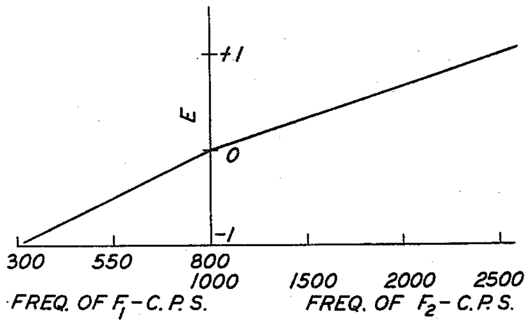

When for any vowel sound the frequency of the first formant is plotted against the frequency of the second formant, a curve such as that of Fig. 1 results. While it is true that more exact values of the vowel sounds do not lie precisely along this curve and that a similar curve itself is modified somewhat both in shape and in location in the frequency scale for any single individual speaker, nevertheless, average values of the first and second formant frequencies for talkers of both sexes and of all ages and inflections may be plotted along this curve without serious error. It has also been determined that for the front and center vowels, vowel quality is principally influenced by the frequency of the second formant, while for the back vowels it is principally influenced by the frequency of the first formant. In view of these facts, acceptance of the minor errors which follow from restricting attention to vowel sounds which lie on this curve makes it possible greatly to reduce the band width of the signal required to represent any such sound. These considerations are turned to account in accordance with the invention by the derivation from an original human speaker's speech wave of a spectrum control signal which is representative at the same time of the frequency of one or other of these two formants and of the identity of the formant represented. In accordance with one aspect of the invention, therefore, this signal may conveniently comprise a control signal which is either of one sign to identify one of the formants or of the other sign to identify the other formant while varying in magnitude between zero and a positive or a negative value as the case may be to represent the frequency of the formant so identified. More specifically, a control signal is derived which varies from minus one volt to zero to represent the variation of the frequency of the first formant from 200 cycles per second to 800 cycles per second, namely, the back vowel range in which the first formant is principally significant, while the control signal varies from zero to plus one volt to represent variations in the frequency of the second formant between 1000 cycles per second and 2400 cycles per second, namely, the front and center vowel range in which the second formant frequency is controlling. These variations of the control signal are depicted in Fig. 2.

Figure 3:
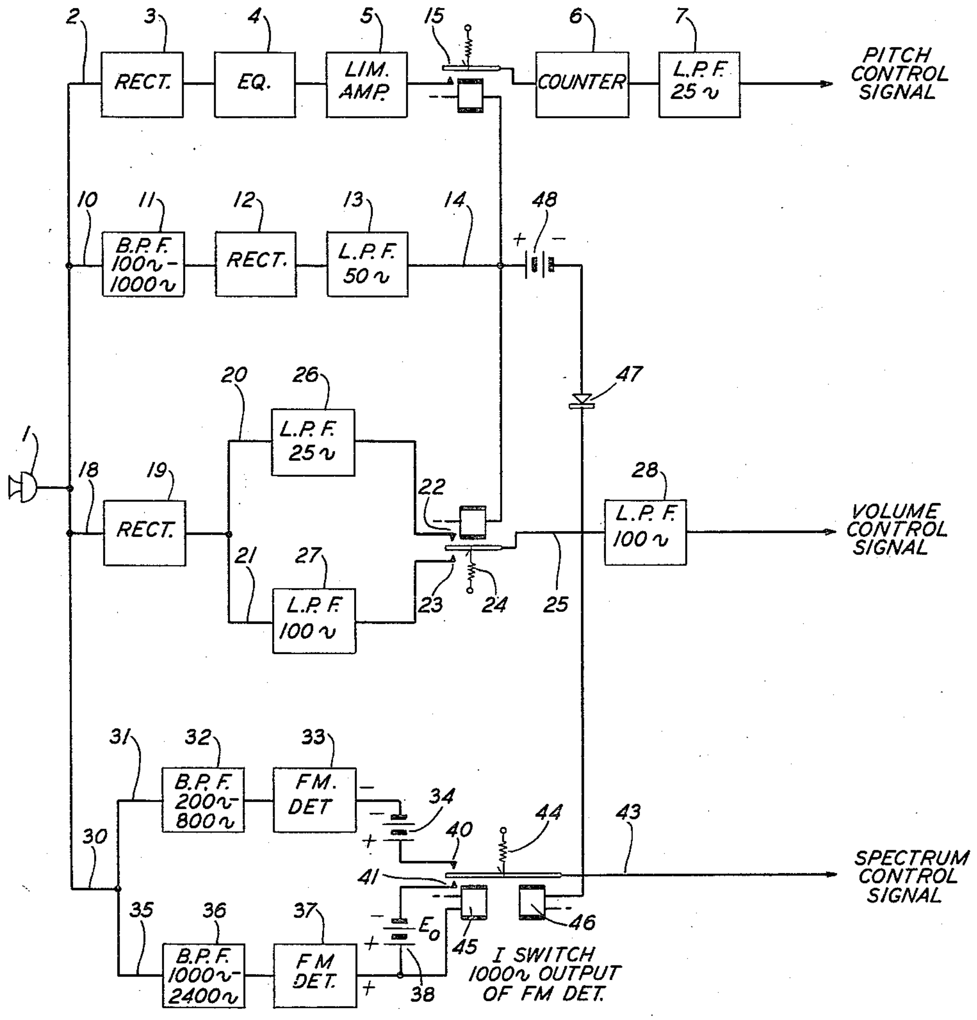
Fig. 3 is a block schematic diagram of analyzing apparatus in accordance with the invention.

Referring now to the apparatus drawings, Fig. 3 shows a system for deriving, from a voice signal to be transmitted, the reduced-band width control signals of these characteristics. In this figure and elsewhere in the present specification energy paths are shown by single lines for the sake of simplicity. It will be understood that in general each such single line energy path may be actualized by a pair of conductors and that the apparatus components shown in block form may be conventional apparatus elements having, generally speaking, two input terminals and two output terminals.

Figure 4:
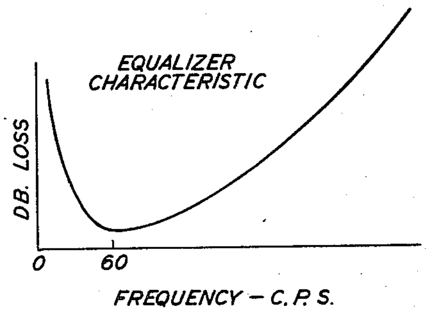
Fig. 4 is the loss frequency characteristic of an equalizer for use in the apparatus of Fig. 1.

A voice wave originating, for example, in a microphone 1 then follows four paths. The upper path 2 comprises a rectifier 3, an equalizer 4 whose attenuation-frequency characteristic may be as indicated in Fig. 4, a limiting amplifier 5, a cycle counter 6 and a low pass filter 7 proportioned to cut off at about 25 cycles per second. This apparatus combination is well known in the art and is disclosed, for example, in Riesz Patent 2,522,539. It serves to make a determination, sufficiently precise for the purposes of the present invention, of the fundamental frequency or pitch of the incoming energy and to deliver on an output conductor a control voltage proportional thereto for use in the manner hereafter described.

The second path 10 comprises a band-pass filter 11 whose pass band extends from approximately 100 cycles per second to approximately 1000 cycles per second, a rectifier 12 and a low pass filter 13 which is proportioned to cut off at approximately 50 cycles per second. This path serves merely to distinguish between voiced sounds and unvoiced sounds, to deliver on an output conductor 14 a control signal in the presence of voiced sounds for use at various points of the apparatus as described below, and to withhold such control signal when the input speech wave is that of an unvoiced sound. Thus in particular, in the presence of a voiced sound the control signal which appears on the output conductor 14 actuates a relay 15 in series with the first path 2, and so establishes a connection between the limiting amplifier 5 and the cycle counter 6, to permit the transmission of a pitch control signal in the manner described above. When, on the other hand, the sound is unvoiced this relay 15 remains unenergized, the upper path 2 contains an open circuit and no pitch control signal is transmitted.

The third path 18 serves to derive a volume control signal. It comprises first a rectifier 19 whose output follows two branches 20, 21 either one of which, but never both, is connected by way of relay contacts 22, 23 to an output conductor. In the presence of a voiced sound the relay armature is pulled up to the contact 22 by the signal on the output conductor 14 of the second path 10 against the tension of a spring 24 so that the output of the rectifier 19 reaches the output conductor 25 only by way of a low pass filter 26 proportioned to cut off at about 25 cycles per second. Employment of this low cut-off frequency serves to exclude the fundamental component of any human voice from this path. When, on the other hand, the sound being uttered is an unvoiced sound, for example one of the fricative stop consonants, the armature of the relay is drawn downward to the contact 23 by the spring 24 and the output of the rectifier 19 reaches the output conductor 25 by way of the lower path 21 which includes another low pass filter 27. This filter 27 may be proportioned to cut off at about 100 cycles per second which gives improved definition in the case of the plosive sounds. This is permissible because, in the cases of fricative and plosive sounds, there is no appreciable fundamental frequency energy to be excluded. Another filter 28, proportioned to cut off at about 100 cycles per second, is included in series with the output conductor 25 merely to eliminate switching transients from the volume control signal.

The resulting volume control signal thus varies in magnitude in substantial proportion to the over-all speech volume or, in other words, to the amplitude of the syllabic speech envelope.

The fourth path 30 followed by the original voice frequency energy again comprises two subpaths of which the upper one 31 includes a band-pass filter 32 proportioned to pass frequencies in the range 200–800 cycles per second followed by a frequency modulation detector 33 and a bias battery 34 while the lower path 35 comprises a band-pass filter 36 proportioned to pass frequencies in the range 1000–2400 cycles per second, a frequency modulation detector 37 and a bias battery 38. By reference to Fig. 1 it will be noted that the pass band of the filter 32 in the upper subpath 31 coincides with the range through which the first formant changes with the enunciation of the various back vowels, while the pass band of the filter 36 in the lower subpath 35 coincides with the range through which the second formant changes with the enunciation of the front and center vowel.

Figure 6:
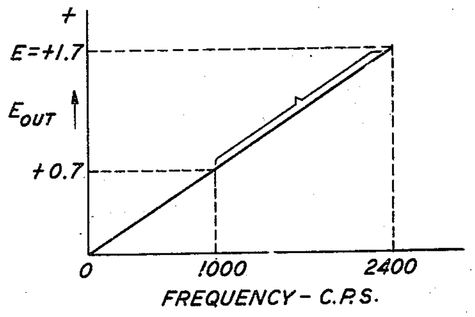

These two paths are severally connected to relay contacts 40, 41 which may be closed in the alternative, thus establishing a connection from one or other of the two frequency modulation detectors 33, 37 to an output conductor 43. The relay armature is drawn upward by a spring 44 in the absence of control signals. Two relay windings 45, 46 are provided and current flowing in either one of these or in both of them draws the relay armature downward to establish a connection to the output conductor 43 from the lower path 35. One of these relay windings 45 is energized by the current output of the frequency modulation detector 37 in the lower path 35. The tension of the spring 44 is balanced against the magnetic pull of the relay windings for a winding current equal to that delivered by the frequency modulation detector 37 in the lower path when the frequency of the energy in that path is 1000 cycles per second, the frequency at which the formant of most significance (Fig. 1) changes from the first to the second. At that frequency, therefore, the winding 45 draws the relay armature downward and establishes a connection to the output conductor 43 from the lower path 35. At this value of the relay winding current, however, the output voltage of the frequency modulation detector 37 is exactly balanced against the voltage of the bias battery 38 so that the voltage switched onto the output conductor 43 has a zero value. This voltage increases positively in magnitude as the frequency of the energy in the lower path 35 increases positively. These relations are shown in Fig. 6, wherein, for the sake of specific example, the magnitude of the bias voltage of the battery 38 is 0.7 volt while the frequency modulation detector 37 delivers an equal and opposite voltage of 0.7 volt for the frequency of 1000 cycles per second and a voltage of 1.7 volts for a voltage of 2400 cycles per second. Thus the voltage on the output conductor 43 varies through a range of 1 volt, namely from 0 to 1 volt as the frequency of the formant recovered by the lower path varies from 1000 cycles to 2400 cycles per second; namely the range covered by the second speech formant in the enunciation of the "front" and "center" vowels.

Figure 5:
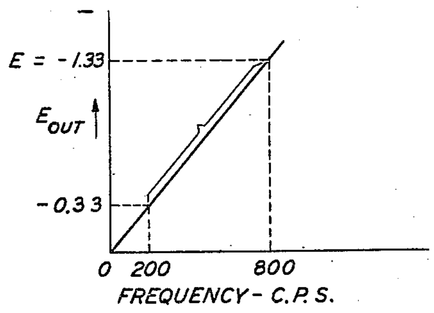
Figs. 5 and 6 are graphs of assistance in explaining the operation of the spectrum control signal apparatus of Fig. 3.

When the frequency of the predominating formant of the speech lies, instead, in the range 200–800 cycles as is the case in the enunciation of the "back" vowels, the relay armature is drawn upward by its spring 44 and the path to the output conductor 43 is established from the upper frequency modulation detector 33 by way of its bias battery 34. This frequency modulation detector, following well-known techniques, is constructed to deliver a voltage of opposite sign from that delivered by the lower one 37. This voltage may, for example, vary as indicated in Fig. 5 from −0.33 volt to −1.33 volts over the frequency range 200–800 cycles per second. So that the current switch shall have zero magnitude at the moment of switching, the larger of these two voltage magnitudes is preferably balanced out by a battery of 1.33 volts. Thus the output conductor 43 carries a signal which varies between −1 volt and 0 as the frequency varies from 200 to 800 cycles per second. A plot of these two output signals on the same scale thus gives the graph of Fig. 2.

In addition, and as a refinement, a second winding 46 may be provided for the relay which draws the armature downward when the sound is an unvoiced one, independent of the strength of the current in the first relay winding 45 and so independent of the frequency of the formant isolated by the band-pass filter 37 in the lower path 35. This may be accomplished in various ways, one illustrative circuit arrangement being the combination, with a rectifier 47, of a bias battery 48 whose voltage is equal and opposite to the output voltage of the voiced signal recognizer in the second path, as it appears on the conductor 14. With this arrangement, when the signal is an unvoiced one, the second path 10 delivers no output and current of the bias battery 48 flows through the second relay winding 46 holding the relay armature down. When the sound is a voiced one the output of the second path output conductor 14 balances the voltage of the battery 48 and this second winding 46 remains unenergized.

Figure 7:
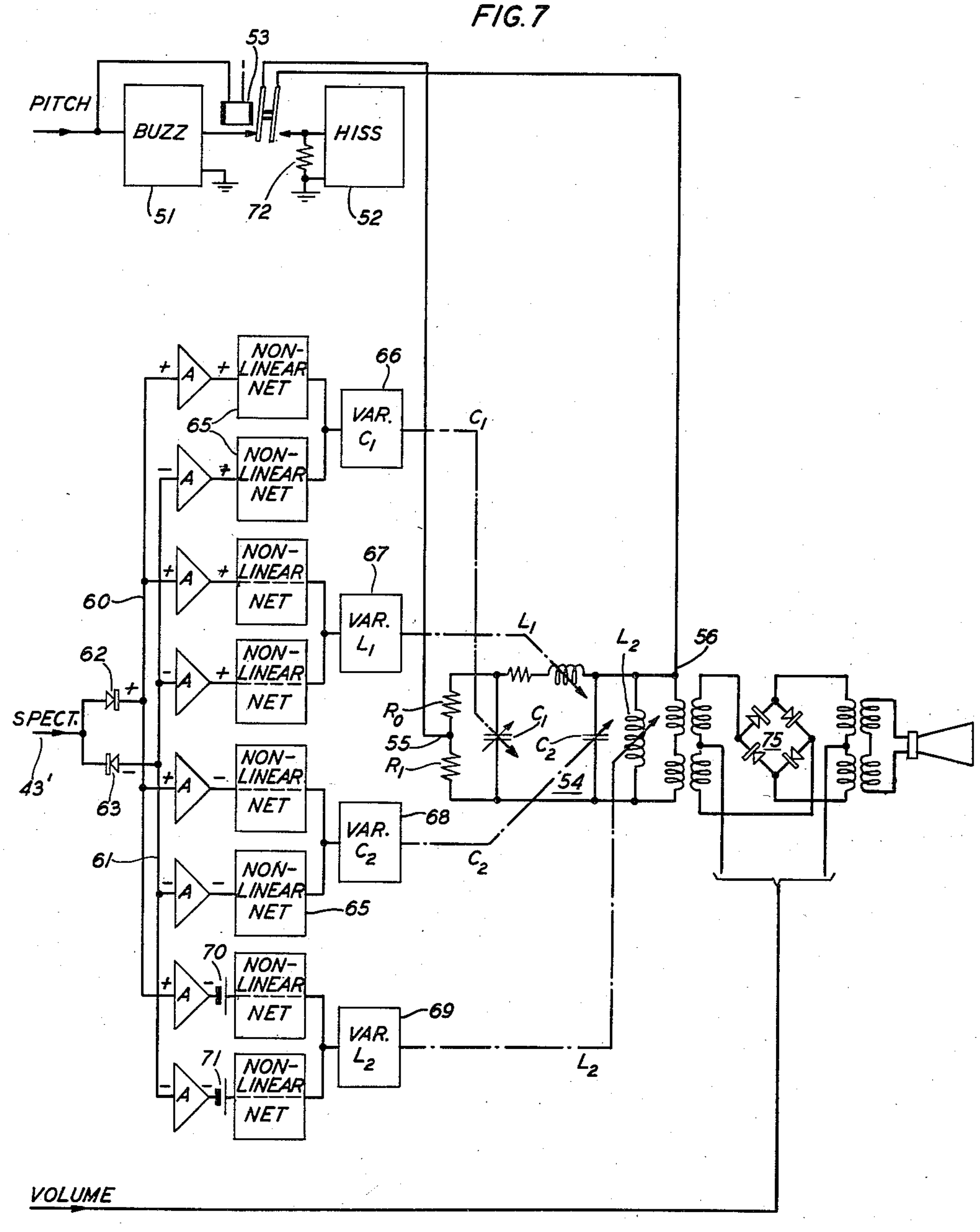
Fig. 7 is a block schematic diagram showing receiver apparatus in accordance with the invention.

The pitch control signal, the volume control signal and the spectrum control signal derived in the manner described above are now transmitted to a receiver station to actuate the artificial voice production apparatus of the invention which is schematically depicted in Fig. 7. The pitch signal is applied in well-known fashion to control a "buzz" source 51 such as a relaxation oscillation in the well-known fashion described, for example, in either of the aforementioned Dudley patents. Also a "hiss" source 52 such as a noise generator is provided, and this, too, may be as described in either of the Dudley patents. In addition a two-contact relay 53 is provided, to be actuated by the pitch control signal in the fashion shown. Thus when the pitch control signal is present, i. e., when a voiced sound is being spoken, the buzz source 51 is connected by way of the relay contacts to the left-hand end 55 of the resonant portion of a synthesizing network 54, while the hiss source 52 is disconnected. On the other hand, when the pitch signal is absent, i. e., in the presence of an unvoiced sound, the buzz source 51 is disconnected while the hiss source 52 is connected to the right-hand end 56 of this same network 54. The significance of these connections will be described below.

Before describing the details of the apparatus which enables the simplified spectrum control signal of Fig. 2 to control the production of speech sounds of various qualities, it is advisable first to discuss the principles on the basis of which this is rendered possible.

Figure 8:
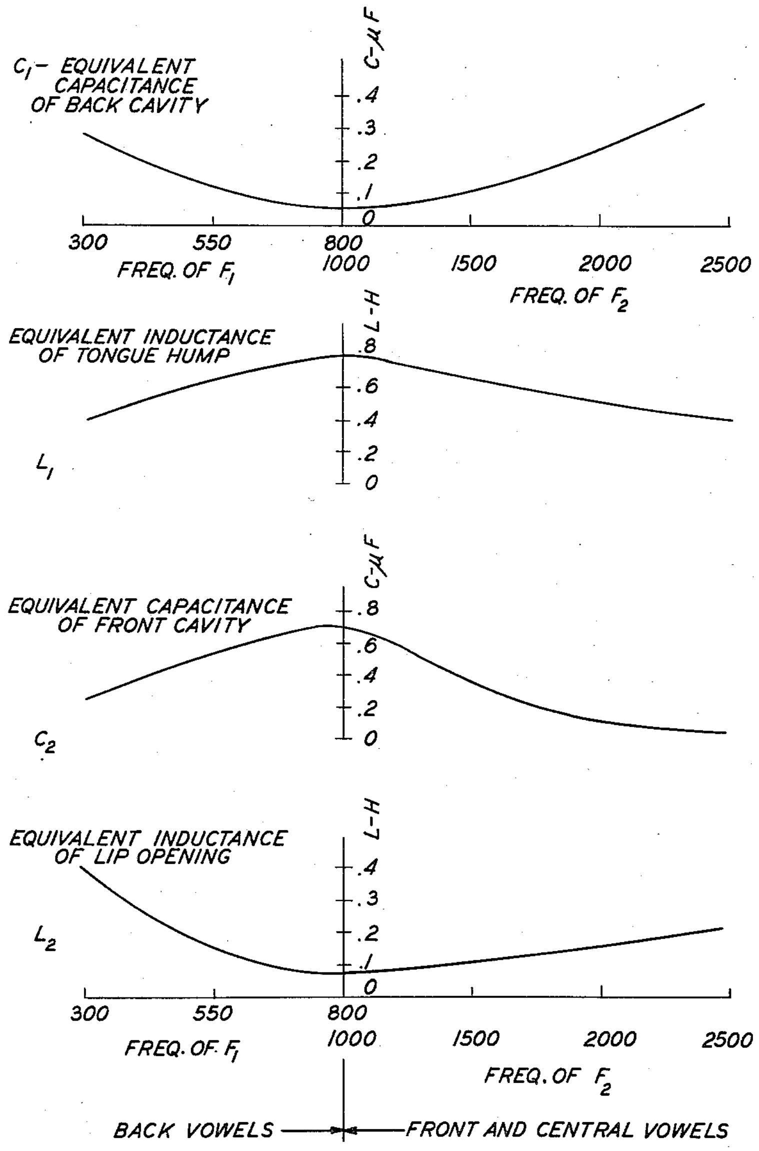
Fig. 8 is a set of curves which represent graphically the variation of the controllable circuit elements of Fig. 7 as functions of frequency.

Measurements of the dimensions of the various parts of the vocal tracts of a number of persons have shown that the character and quality of each speech sound are to a large extent determined by the volume of the back cavity, the length and cross section of the tongue-hump constriction, the volume of the front cavity, and the length and cross section of the lip opening. In the act of speaking the oscillatory energy which, in the case of voiced sounds originates in the vocal cords, is shaped and modified by the compliances and inertances of these parts of the vocal tract, and differences in the magnitudes of these parameters produce differences in this modifying action which are recognized by a hearer as meaningful differences in the character or quality of the speech sound. The many data on each of these mechanical impedances have been averaged and each of the resulting average values has been converted by known transformation techniques into its electrical counterpart as a parameter for the electrical vocal tract simulating network. These electrical parameters have been plotted against formant frequency in Fig. 8, where $C_1$ is the equivalent capacitance of the back cavity $L_1$ is the equivalent inductance of the tongue-hump constriction $C_2$ is the equivalent capacitance of the front cavity, and $L_2$ is the equivalent inductance of the lip opening Inasmuch as the format frequencies of Fig. 8 are the same as those of Fig. 2, it will be seen to be possible, in principle, to relate the parameter values of Fig. 8 to the control signals of Fig. 2, and to do so uniquely. By employing voltage-responsive parameters of appropriate construction it is also possible to swing each of the parameters of Fig. 8 over the required range by applying to it the control voltages of Fig. 2. The manner in which the apparatus of Fig. 7 carries out the required operations will now be described.

The spectrum control channel, arriving on the path 43′, is first broken into two paths 60, 61 by way of oppositely-poled rectifiers 62, 63. Each of these two paths is further broken down into four subpaths and each of these subpaths includes an amplifier. Some of these amplifiers are arranged to provide reversal of phase as between its input and its output and some are arranged for retention of phase relation. Techniques by which this can be arranged are well known. As the simplest example, it is merely remarked that it is always possible to effect a phase shift of 180 degrees by the addition of one grounded-cathode stage of amplification to whatever apparatus is provided for other reasons. The phase relations required of these individual amplifiers are shown by plus and minus signs indicated at the input and output terminals of each one.

The amplifiers are grouped by pairs, one for positive input voltages from the first path 60 and another for negative input voltages from the second path 61 and the output terminals of the two members of each such pair are connected, in some cases by way of non-linear networks 65 as shown, to control elements indicated as variable capacitances 66, 68 or variable inductances 67, 69 as the case may be.

Figure 9:
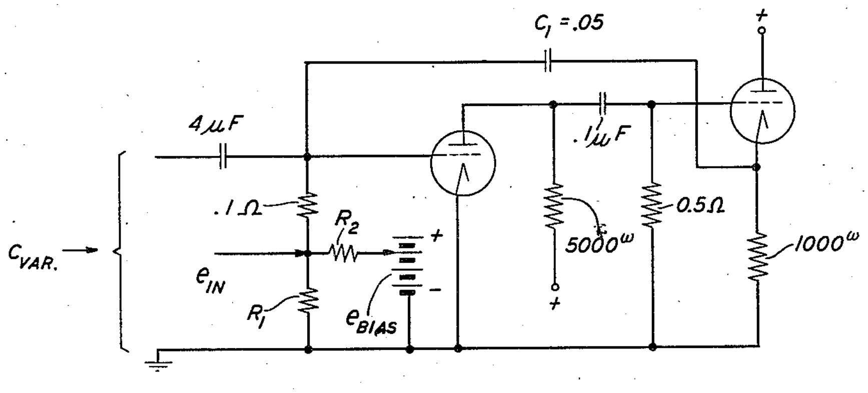
Fig. 9 is a schematic circuit diagram of a current controlled capacitance.

Passing for the moment the construction and functions of the non-linear networks 65 and coming at once to these variable network elements, a variable capacitance may conveniently comprise a reactance tube circuit of conventional variety or an improved reactance tube circuit such, for example, as that shown in Fig. 9 which has been found in practive to afford substantially linear variation of apparent input capacitance seen at the effective capacitance terminals over a range of as much as 14 to 1 for variations in the control voltage applied to its input terminals of the order of 1 volt or so. Consider then the action of the upper amplifier pair and the upper variable capacitance 66 in the presence of the spectrum control signal which, as shown in Fig. 2, may lie anywhere in the range of −1 volt to +1 volt. When it is positive the upper amplifier delivers an output signal which is proportional to it and of the same sign. This is applied by way of the non-linear network 65 to the input terminals of the reactance tube circuit of Fig. 9 and the effective capacitance appearing at its output terminals takes on a specified predictable value determined by its construction and by the magnitude of the voltage applied to it. As long as the input spectrum control signal continues in the positive range this effective capacitance varies accordingly. When, on the other hand, the input spectrum control signal lies in the negative range the upper amplifier receives no signal, the lower one receives a negative signal, converts it into a positive signal and delivers it, again by way of a non-linear network 65 to the input terminals of the reactance tube circuit 66.

Figure 10:
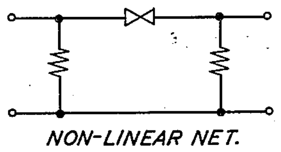
Fig. 10 is a circuit diagram of a non-linear volume expander network.

It is well known that by the inclusion of a T-section network comprising a pair of resistors and a silicon carbide element as shown in Fig. 10, an input voltage which varies linearly may be converted into an output voltage which follows an approximate square law. Here the constant of proportionality which relates the output to the square of the input may be controlled over wide limits in well-known fashion by the choice of the magnitudes of the ohmic resistors and the characteristics of the silicon carbide element. As a consequence, the effective capacitance presented by the reactance tube network varies closely in proportion to the square of the voltage applied to the amplifiers and independently of their signs. The resulting variation of the capacitance $C_1$ with the frequency of the voice formant in which the spectrum control signal originated is shown in the upper curve of Fig. 8.

The third pair of amplifiers are connected in much the same fashion to an effective variable capacitance network 68, which again may be a reactance tube network as shown in Fig. 9. Referring to the third cruve of Fig. 8, it will be observed that the required variation of capacitance is generally of opposite sign to that for the capacitance $C_1$. This result is broadly secured in accordance with the present arrangement by the provision of a phase inversion for the upper amplifier of the pair and no phase inversion for the lower amplifier of the pair. Thus the upper amplifier converts a spectrum control signal in the positive voltage range into a negative one while the lower amplifier merely duplicates a voltage in the negative part of the spectrum control signal range without changing its sign. The outputs of these amplifiers are applied by way of non-linear networks such as that of Fig. 10 to the variable capacitance 68 to control its effective capacitance $C_2$. By proportioning the magnitudes of the resistors of the non-linear network and its silicon carbide element in known fashion the effective capacitance of the element 68 may be caused to vary over the frequency range of interest in the fashion shown in the third curve of Fig. 8.

The second and fourth amplifier pairs are connected to variable inductance elements 67, 69. They are shown as being so connected by way of non-linear networks. This, however, is for the sake of generality because as a matter of fact it is a comparatively simple matter to construct a variable inductance element which varies with its input current in the require fashion without resort to any additional non-linear network. For this reason these networks are shown short-circuited. Such networks may, however, be employed if desired, either to refine the results depicted in the second and fourth curves of Fig. 8 or to permit such results to be secured with variable inductance elements other than the preferred one about to be described.

Figure 11:
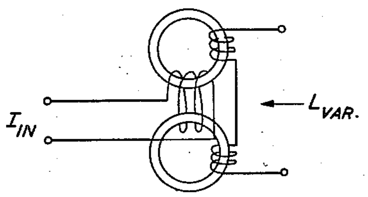
Fig. 11 is a circuit diagram of a non-linear inductance element.
Figure 12:
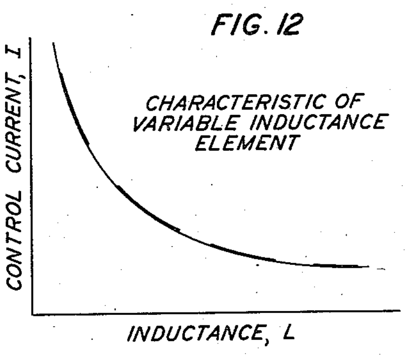
Fig. 12 is a characteristic curve representing the performance of the inductance element of Fig. 11.

A simple element whose impedance is to a large extent inductive and the inductance of which varies with a control signal is shown in Fig. 11. It comprises a pair of cores of saturable ferromagnetic material provided with a first winding whose terminals present the required variable inductance and a second winding which carries the control current. It is well known that the inductance of the working winding of such an arrangement varies approximately hyperbolically with the magnitude of the control current as indicated in the curve of Fig. 12. By proportioning the dimensions of the magnetic core and the numbers of turns of the respective windings it is possible to arrange that the effective inductance vary with the control current or its corresponding control voltage over any desired portion of such a curve. Such techniques are well known and require no further elaboration. Howver, for independent control of the rate of variation of the inductance with the control current and at the same time the average value of the inductance and the range through which it varies, some bias means are preferably provided. One way in which such bias may be provided is by the addition of a bias battery 70, 71 in series with the output terminal of the amplifier which delivers the control current to the variable inductance element. Such bias batteries are shown in connection with the amplifiers of the lower pair. They are not required in connection with the amplifiers of the second pair which control the inductance $L_1$.

In the production of artificial speech by known techniques, it has been usual to apply the buzz source of the hiss source, as the case may be, to the input terminals of a resonant circuit or other wave-shaping network which modifies the frequency distribution of the energy of the source before it is applied to a sound reproducer. Thus, the wave-shaping network operates in the same fashion on the energies of these two sources.

When the construction and operation of the human vocal tract are examined, it will easily be noted that while the vocal cords constitute the energy source for voiced sounds, the vocal tract being thus a transmission path, the energy source for unvoiced sounds, such as the plosives, the sibilants, and the fricatives, is located at or very close to the lips, in which case the vocal tract acts as a frequency-dependent reflector.

In accordance with the invention, the analogy between the human vocal tract and its electrical counterpart extends not only to an element-for-element similarity between the tract itself and the simulating network, but extends also to the location of the input point for the actuating energy. Specifically, by analogy with the placement of the vocal cords in the throat, the output of the buzz source 51 is applied to the left-hand end terminal 55 of the simulating network 54 while, by analogy with the generation of fricative or hissing sounds at the end of the vocal tract which is closest to the lips, the output of the hiss source 52 is applied to the right-hand end terminal 56 of the simulating network 54. While the energy of the buzz source 51 is modified by transmission through the network 54, the energy of the hiss source 52 is modified by reflection by the network 54.

It is known that the unvoiced sounds are more highly damped than the voice sounds. To simulate the increased damping of the unvoiced sounds, a damping resistor 72 is included in the circuit of the hiss source 52. It is brought into play automatically by the relay 53 when its armature makes contact with the output terminal of the hiss source 52 in the fashion earlier described.

The volume control signal derived by the analyzing apparatus of Fig. 3 in the fashion described above is applied to control the volume of the artificially produced sounds in any desired fashion as, for example, by application to the control terminals of a variolosser 75 of conventional variety.

Various refinements and extensions of the apparatus herein shown and above described will suggest themselves to those skilled in the art. For example, for spectrum control signals, instead of a single signal representing by one characteristic the identity of the predominant formant and by another characteristic its frequency, two signals may be transmitted, one representing the frequency of the first formant and the other the frequency of the second formant. These signals may easily be distinguished from one another and so routed into their individual channels in terms of some characteristic other than that relied upon for carrying frequency information. The transmission to the receiver of these two individual signals furnishes greater flexibility of control of the resonant circuit apparatus at the receiver and permits the artificial production of speech sounds in addition to those lying along the curve of Fig. 1. In other words, it makes for greater naturalness of reproduction at the cost of increased transmission band width.

Extensions and refinements of the vocal tract-simulating apparatus itself are also possible. A more elaborate electrical counterpart of the human vocal tract than that employed herein for illustration has been described by H. K. Dunn in the Journal of the Acoustical Society of America for November 1950 (volume 22, page 740), and by L. O. Schott in the Bell Telephone Laboratories Record for December 1950 (volume 28, page 549). The simplified control signals discussed above may be employed to vary the circuit elements of such more elaborate resonant circuits. Furthermore, by reason of their great flexibility, such more elaborate circuits may give improved naturalness of the artificially produced sounds, there being parctically no limit to such naturalness provided the corresponding price is paid in terms of the complexity of the control signals and of the controling apparatus.

It is well known that there exist certain characteristic differences in the locations on the frequency scale of the voice formants as between adult males, adult females, and children. In the construction of the circuit element variation curves of Fig. 8, these differences have been averaged out. As a refinement, however, they may be taken account of. Thus, for example, it is possible to provide as a refinement to the apparatus shown an additional control over the element values of the vocal tract-simulating network, to be controlled by the fundamental pitch signal which is derived at the analyzer and transmitted to the synthesizer. In the illustrative system described above, this fundamental pitch signal operates only to tune the buzz signal and to control the switching as between the buzz source and the hiss source. It is contemplated that by the addition of appropriate current-responsive reactance elements such as those shown in Figs. 9 and 10, or by a suitable modification of the control voltages or currents presently supplied to the elements $L_1$, $L_2$, $C_1$, $C_2$, it may tune the simulating network as a whole so that the artificially produced sounds may simulate the voice sounds of a man, a woman, or a child, as the case may be.

Still other variants of the apparatus described will suggest themselves to those skilled in the art.

What is claimed is:

1. In a system for deriving control signals of use in artificial production of speech, means for analyzing a speech sound to determine and segregate at least two interdependent characteristics thereof, means for selecting from among said characteristics that one which is chiefly significant in determining the character of said speech sound, means under control of said selecting means for deriving a control signal which is representative of the identity of said selected characteristic, and means for varying said control signal conformably with variations of said selected characteristic.

2. In combination with apparatus as defined in claim 1, means for generating and varying positive values of the control signal to represent the magnitude of one of said speech sound characteristics and means for generating and varying negative values of the control signal to represent the magnitude of the other of said speech sound characteristics, the polarity of the control signal being representative of the identity of the characteristic selected.

3. In a system for artificial production of speech, means for analyzing a speech sound to determine and segregate at least two interdependent characteristics thereof, means for selecting from among said characteristics that one which is chiefly significant in determining the character of said speech sound, means under control of said selecting means for deriving a control signal which is representative of the identity of said selected characteristic, means for varying said control signal conformably with variations of said selected characteristic, a receiver station, speech synthesizing apparatus at said receiver station, means for transmitting said control signal to said receiver station, and means at said receiver station for applying said control signal to said synthesizing apparatus to control the synthesis of artificial speech.

4. In a system for artificial production of speech, means for analyzing a speech sound to segregate the fundamental frequency component, the first formant and the second formant, means for selecting from among said first and second formants of each speech sound that one which is chiefly significant in determining the character of said speech sound, means for deriving control signals which are individually representative of the volume of said speech sound and the frequency of its fundamental component, means under control of said selecting means for deriving a control signal having a polarity representative of the identity of said selected formant, and means for varying the magnitude of said last-named control signal in relation to the principal frequency of said selected formant.

5. Apparatus as defined in claim 4 wherein the means for selecting the formant of chief significance comprises a branch point, means for applying speech sound energy to said branch point, a first path leading from said branch point and having in series therewith a first filter proportioned to pass frequencies in the lower portion of the voiced-sound frequency range, a second path leading from said branch point and having in series therewith a second filter proportioned to pass frequencies in the upper portion of the voiced-sound frequency range, an outgoing line, a switch for connecting said first path or said second path alternatively to said outgoing line, means normally operating said switch to connect said line to said first path, and means controlled by voiced-sound energy in said second path for operating said switch to connect said line to said second path.

6. Apparatus as defined in claim 4 wherein the means for selecting the formant of chief significance comprises a branch point, means for applying speech sound energy to said branch point, a first path leading from said branch point and having in series therewith a first filter proportioned to pass frequencies in the lower portion of the voiced-sound frequency range and means for determining the principal frequency within said lower range portion, a second path leading from said branch point and having in series therewith a second filter porportioned to pass frequencies in the upper portion of the voiced-sound frequency range and means for determining the principal frequency in said upper range portion, an outgoing line, a switch for connecting said first frequency measuring means or said second frequency measuring means alternatively to said outgoing line, means normally operating said switch to connect said line to said first frequency measuring means, and means controlled by the output of said second frequency measuring means for operating said switch to connect said line to said second path.

7. In combination with apparatus as defined in claim 6, means controlled by energy of unvoiced sounds to connect said line to said second path independently of energy in said first path.

8. In combination with apparatus as defined in claim 4, a source of waves of variable frequency, a sound reproducer energized from said source, electrical resonance means connected between said source and said reproducer for controlling the character of the reproduced sounds, said electrical resonance means including variable reactive elements and being capable of variation of resonance and simulating the effects of the resonant air cavities of the mouth, a formant control signal input point, two independent paths extending from said input point to said variable reactive elements, one of said paths including a fixed circuit element for establishing a desired relation between first formant frequency energy entering said path and the setting of said variable elements, the other of said paths including a fixed circuit element for establishing a different desired relation between second formant frequency energy entering said path and the setting of said variable elements, means responsive to the polarity of said formant control signal for directing said formant control signal, when of a first polarity, into the first one of said paths and for excluding it from the second path, and for directing said formant control signal, when of the opposite polarity, into the second one of said paths and excluding it from the first path, and means for varying the frequency of said wave source under control of said fundamental frequency control signal.

9. In combination with apparatus as defined in claim 8, means for varying the sound reproducer volume under control of said volume control signal.

10. In a system for artificial production of speech, sources of electrical waves having the characteristics of voiced and unvoiced sounds, respectively, a sound reproducer energized from said sources, electrical resonance means having a first pair of terminals and a second pair of terminals, the second pair of terminals being connected to said reproducer, means for connecting the voiced-sound source to the first pair of terminals, whereby the waves of the first source are modified by transmission through said resonance means before application to said reproducer, and means for connecting the unvoiced-sound source to another point of said resonance means, whereby the waves of the unvoiced-sound source are modified before application to the reproducer in a different fashion from the modification of the waves of the voiced-sound source.

11. In a system for artificial production of speech, sources of electrical waves having the characteristics of voiced and unvoiced sounds, respectively, a sound reproducer energized from said sources, electrical resonance means having a first pair of terminals and a second pair of terminals, the second pair of terminals being connected to said reproducer, means for connecting the voiced-sound source to the first pair of terminals, whereby the waves of the first source are modified by transmission through said resonance means before application to said reproducer, and means for connecting the unvoiced-sound source to the second pair of terminals whereby the waves of the unvoiced-sound source are applied to the reproducer both directly without modification and, after modification by reflection on said resonance means, indirectly.

12. Means for deriving a control signal which is representative of the volume of a speech sound, which comprises a branch point, means for applying speech sound energy to said branch point, a first path leading from said branch point and having in series therewith a first filter proportional to pass only syllabic frequencies of voiced sounds, a second path leading from said branch point and having in series therewith a second filter protioned to pass only syllabic frequencies of unvoiced sounds, an outgoing line, a switch for establishing a connection from said first path or said second path alternatively to said outgoing line, means controlled by voiced-sound energy for operating said switch to connect said line to said first path, and means operative in the absence of voiced-sound energy for operating said switch to connect said line to said second path.

References Cited in the file of this patent

UNITED STATES PATENTS

| | | |
|---|---|---|
| 2,243,526 | Dudley | May 27, 1941 |
| 2,243,527 | Dudley | May 27, 1941 |
| 2,522,539 | Riesz | Sept. 19, 1950 |